(12) United States Patent
Roztocil et al.

(10) Patent No.: US 7,090,417 B2
(45) Date of Patent: Aug. 15, 2006

(54) METHOD OF PROGRAMMING PAGES WITHIN A DOCUMENT TO BE PRINTED ON DIFFERENT OUTPUT DEVICES

(75) Inventors: Tomas Roztocil, Caledonia, NY (US); Leonard R. Christopher, Palmyra, NY (US)

(73) Assignee: Eastman Kodak Company, Rochester, NY (US)

( * ) Notice: Subject to any disclaimer, the term of this patent is extended or adjusted under 35 U.S.C. 154(b) by 71 days.

(21) Appl. No.: 10/692,186

(22) Filed: Oct. 23, 2003

(65) Prior Publication Data

US 2005/0042009 A1 Feb. 24, 2005

Related U.S. Application Data

(60) Provisional application No. 60/422,170, filed on Oct. 29, 2002.

(51) Int. Cl.
*B41J 5/30* (2006.01)

(52) U.S. Cl. .............................. 400/62; 400/61; 400/76; 358/1.15; 358/1.18

(58) Field of Classification Search .................. 400/61, 400/62, 70, 76; 358/1.1–1.9, 1.11–1.18
See application file for complete search history.

(56) References Cited

U.S. PATENT DOCUMENTS

| | | | | |
|---|---|---|---|---|
| 5,859,711 A | * | 1/1999 | Barry et al. | 358/296 |
| 5,978,557 A | * | 11/1999 | Kato | 358/1.15 |
| 6,476,930 B1 | * | 11/2002 | Roberts et al. | 358/1.18 |
| 6,650,431 B1 | * | 11/2003 | Roberts et al. | 358/1.15 |
| 2003/0002069 A1 | * | 1/2003 | Bhogal et al. | 358/1.15 |

* cited by examiner

*Primary Examiner*—Minh Chau
(74) *Attorney, Agent, or Firm*—Justin D. Petruzzelli

(57) ABSTRACT

Provision is made for identifying selected pages of a document to be automatically sent for printing to one of two or more printing devices. As an example, specific pages can be flagged for printing on a color device while remaining pages stay in default mode, which could be pre-selected as a particular black and white printing device. Upon submission of the job for printing, black images are automatically sent to the black and white device while color pages are sent to a specified color device. The original job remains intact and particular page level settings remain with the job for future use.

21 Claims, 3 Drawing Sheets

METHOD OF PROGRAMMING PAGES WITHIN A DOCUMENT TO BE PRINTED ON DIFFERENT OUTPUT DEVICES

RELATED APPLICATION

This application claims priority to U.S. Provisional Patent Application 60/422,170, titled "METHOD OF PROGRAMMING PAGES WITHIN A DOCUMENT TO BE PRINTED ON DIFFERENT OUTPUT DEVICES" which was filed on Oct. 29, 2002 and which is incorporated herein by reference in its entirety.

FIELD OF THE INVENTION

This invention relates to the programming of printing systems and more specifically to the selection of output devices in an automated printing system having multiple output devices.

BACKGROUND OF THE INVENTION

More and more printing is done in color, which is more expensive than printing in black and white. Customers are looking for more cost effective alternatives. One such alternative is to print only selected pages of a document in color while remaining pages are printed in black and white.

Two conventional methods for printing selected pages in color are practiced today: manual and automatic. The manual method creates the entire document, including color pages, assigning page numbers, annotations, etc., and then manually and electronically splits the job into two separate files, one for color printing, one for black and white. Splitting results in three separate versions of the original electronic document that must be maintained along with the original file: the initial combined version, the split-off color-printing portion, and the split-off black and white portion. If a content change is required, all three electronic documents frequently must be re-created from the original file. This method works well, but it is cumbersome and time-consuming. In other words, an initial computer file is separated into to other computer files, one for color and one for black and white.

The automatic method uses an algorithm to analyze the actual image data in order to identify either RGB or CMYK color content. The automatic method sets a threshold level for the color content, and uses its algorithm together with the threshold level to route pages automatically either to a black and white printer or a color printer. This method can be very productive, but the accuracy of the algorithm is limited, resulting in black and white pages being printed on the color device or vice versa. Furthermore, this method requires additional hardware and software which can add significant extra cost. Even when the automatic method works well, the printing process is relatively slow. Where color and black and white print engines are in one machine, one engine is idle while the other is printing. Black and white documents print quicker than color documents. If a machine is tasked with printing both color and black and white, the color prints will consume a substantial amount of time during which the black and white print engine is idle.

SUMMARY OF THE INVENTION

The invention provides for a method for a user to identify selected pages of a document in a single electronic file and for routing or suppressing the identified documents before pages are submitted to a device for printing. Based on the identifying information associated with each page, the selected pages are automatically separated and routed for printing to any one of a set of printing devices. For example, the invention allows an operator to specify that specific document pages will print bus a color print engine while unselected pages are printed on a black and white printing engine. Upon submission of the job for printing, black images are automatically sent to the black and white engine while color pages are sent to a specified color engine. The invention provides for advance specification of one or more default printing devices, to be used when no specification of selected pages is provided or when unselected pages are to be printed. The invention leaves the original job and electronic file intact, and leaves particular page level settings with the original job for future use. The separately printed color pages are loaded into an inserter that collates the color pages with the black and white pages to form completed booklets of color and black and white pages.

DETAILED DESCRIPTION OF THE INVENTION

This invention is implemented in conjunction with print driver software, print/downloader software, printer user interface, remote print job programming software or in conjunction with any other application that is used to program job and page level features in preparation of a document for printing.

Today there are various means of programming a document for printing, including printing features applied to the entire job (Job Level Features) and features that apply only to specific pages in a job (Page Level Features). An example of a page level feature may be that it is printed on different paper stock, or be assigned other features specific only to that image. An example of such programming software can be seen in the Heidelberg ImageSmart Document Mastering Suite, which provides a visual means of attaching page level features to each page.

Figure 1:
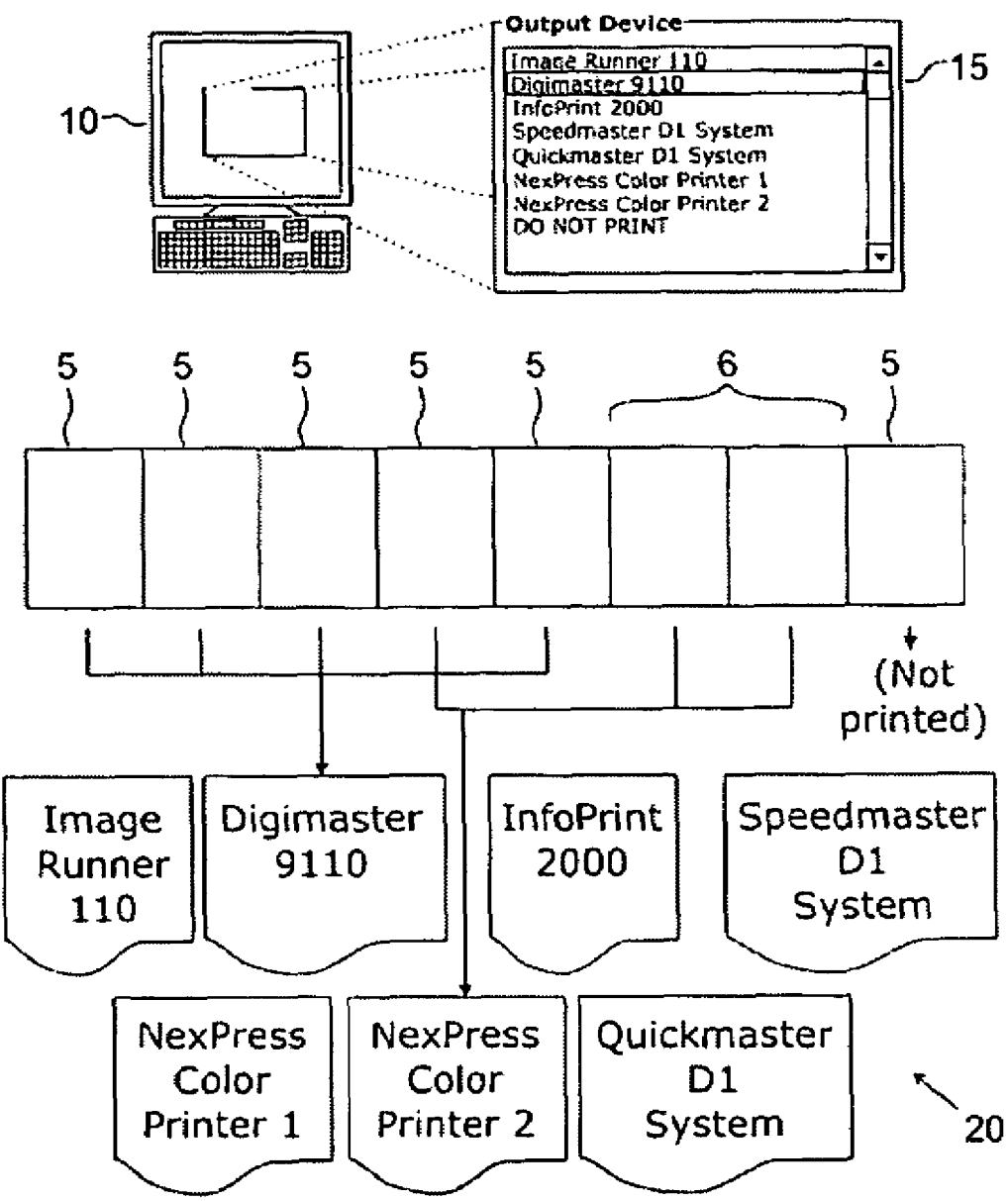
FIG. 1 shows an overview of the invention's output selection process.

Prior art processes have assigned different printer exits to specific pages or sets of pages. The present invention expands this capability to provide for selecting different printing engines for each different subset of pages of the same document, using a menu of print engines available over the network. See FIG. 1.

In a first embodiment, the operator views pages 5 on a workstation 10, and on menu 15 marks each page 5 or range of pages 6 to select a print engine 20 for that page 5 or range of pages 6. At the time of printing or other output, each page will be routed to the print engine 20 selected by the operator.

Figure 2A:
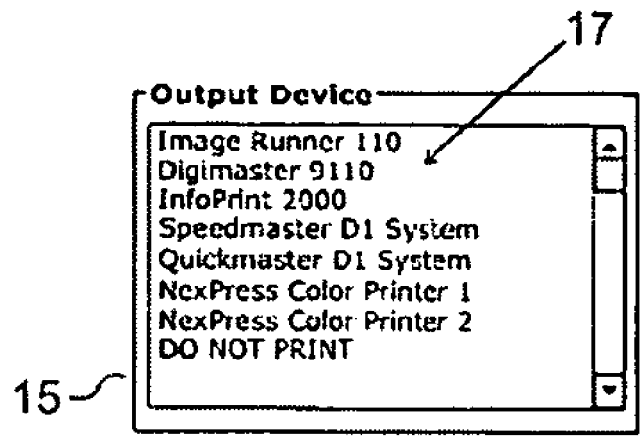
FIG. 2A shows the invention's printer selection menu for the operator.

See FIG. 2A. The menu 15 of print engines takes the form of a pull-down type menu or any other type of menu that allows a specific print engine selection for the selected page or set of pages. The list of printers 17 may be customized using methods well-known in the art to reduce the search required when a longer printer list is normally available. The method of printer selection includes and is not limited to a right mouse click on a particular icon, thumbnail or other visual representation means of the particular page, coupled with a similar method of selecting the desired print device. The preferred embodiment of the invention uses a single mouse click for its method for operator selection of a print device. The invention provides a default print engine assignment for pages not marked by an operator via the selection menu 15.

The invention also provides a default color printer assignment for use with documents in which one or more "color insert" pages have been designated, and a default black and white printer assignment for use with color documents in which one or more black and white insert pages have been designated. Either of these assignment methods may be used as an alternate means for programming specific pages individually to go to specific output devices. Default assignments of printers for color or black and white insert pages are provided by the operator when setting up or modifying printer menus.

The print engine selection menu may also include a selection called "This page will not be printed" or "Hide this page in printed version". This selection allows the operator to intentionally exclude a particular page or grouping of pages from the printed document, while preserving the original document in its complete state. The invention includes easy visual means of recognizing that a particular page will be excluded from the printed document, such as an icon of a printer crossed by a red line marking the page in the document file to be printed.

Selection of other output devices is not restricted to printers. To save printing costs and make data available directly to a reader's computer, some documents are bound with CD-ROMs, floppy disks, or other electronic storage media. Lengthy program listings, highly-detailed graphics, animations, and audio and video presentations are often desired as elements of a publication. Such elements are not appropriately included physically in a printed document for reading from the printed page, either because of cost or because of complexity of presentation. Such elements, represented digitally, may be incorporated either directly or by reference in a file destined to be published. Given that certain pages of a document may be packaged and presented by means other than printing on a sheet for binding and subsequent reading, output devices other than printers may be specified for a given page or set of pages. For example, one or more pages in an electronic file may contain or otherwise reference additional files of text, audio, video, or special presentation software to be incorporated in a document as files on a packaged CD-ROM or DVD. Such pages are published by routing them and their referenced contents to a sequence of devices for generating, packaging, and binding such an optical storage component into the desired final document, just as CD-ROMs are now packaged with published books. A typical sequence of such devices might include a CD-ROM burner, a CD-ROM sleever and sealer, and a device for attaching a CD-ROM sleeve to a document page or cover. The classes of such special page and file treatments include, but are not limited to, CD-ROMs and DVDs or other optical storage media, transparencies for projection, microfilm or microfiche transparencies, floppy disks or other magnetic or magneto-optical storage media, or holograms for projection or display. The invention's device selection menus incorporate choices for devices such as those described in this paragraph, and other devices providing still further choices for output. A further choice for output includes network routing instructions for production of one or more components of the final document in remote geographic locations, and on non-printing devices such as display screens.

The invention's feature selections augment other page-specific features described in previous art, such as paper stock page exceptions.

In the programming of page handling, pages as stored for printing are treated as objects. Once the "print destination" selection is associated with a particular page object, it remains with the page object even if the page is moved in a different location in the document or even if the page is moved to or merged with another document.

Printing processes use a job setup summary display to show an operator an overview of each print job. In the job set up summary, the information regarding "print destination" is displayed in addition to other job and page level features, such as, "Pages 2,6,9,21 will be sent to Printer (COLOR_NAME_001)".

Upon submission of the job for printing, the application software will search for the "print destination" information in the page level feature header and separate those pages with different "print destination" information, group them in proper order and submit them automatically to the selected print device driver. By contrast with conventional processes, the invention's page-level separation process in no way affects the print file itself, and does not generate new separate print files requiring manual attention.

Figure 2B:
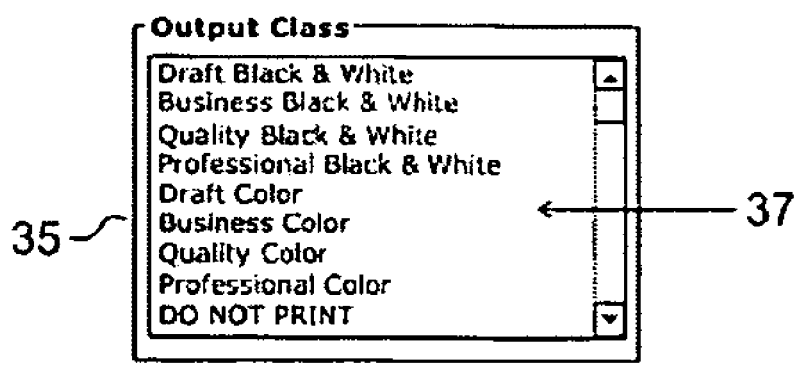
FIG. 2B shows the invention's output class selection menu for a client.

In a second embodiment of the invention, two levels of output device selection are supplied: a first level of selection for the client originator of the file to be printed, and a second level of selection for the operator of the printing systems producing the actual copies of the document. See FIG. 2B. In the first level of selection, the client uses a general menu 35 to select general output requirements from a list 37 for particular page ranges, such as printing some pages in black and white at one overall quality level, printing other pages in color at another quality level, printing on a given general type and color of stock, and so forth. In the second level of selection, shown in FIG. 2A, the operator of the printing systems examines the general output requirements specified by the client and uses the invention's menu 15 to translate them into specifications of appropriate output devices from list 17 for each range of pages. In places where the client has not specified general changes from one series of pages to the next, the operator may originate the specification of appropriate output devices for pages or ranges of pages just as in the invention's first embodiment.

As an example, a client might tag a certain page of a document for printing in color, with all other pages tagged by default for black and white. When the operator receives the document file, the tag for color printing appears on the selected page. The operator translates the color specification into a specific printer assignment according both to the available set of color printers and to the desired level of print quality expressed by the client. This feature of the invention offers more-complete control to the client without diminishing the operator's freedom to select specific output devices, and simplifies the operator's task in identifying pages requiring special treatment. This feature of the invention operates both on the client's system and on the operator's system.

The invention also provides for output device selection by the operator that names a pool of functionally-identical devices, letting the printing system select the actual device without further intervention by the operator. In this case the printing system notifies the operator of the actual device selected.

As an example of the invention's operation, a single file formatted for printing contains a thousand billing statements, each addressed to an individual. Each individual's statement might have one page or multiple pages. Of the thousand recipients, a hundred of them are deadbeats, who haven't paid in the last 30 days. The user of the invention wants a special message to the deadbeats printed in red. A particular statement for a deadbeat recipient might require several pages, one of which contains the red message. The output device to be used for printing in red is a color printer. The output device to be used for all remaining printing is a black and white printer. In a first scenario using two physically-separate printers, the invention marks pages of the file containing statements going to deadbeats to be routed to the color printer, and marks all other pages of the file to be routed to the black and white printer. Since the file's printed output does not require recombination, the printed statements can then be stuffed in envelopes according to statement separation marks stored in the file. In this first scenario, only the statements addressed to the deadbeats are printed on the color printer.

In a second scenario using an integrated system containing a color printing unit and a black and white printing unit, the invention marks pages of the file containing only the special message in red to be routed to the color printer, and marks all other pages of the file to be routed to the black and white printer. In this second case, the file's printed output is recombined in the integrated system. The printed statements can again be stuffed in envelopes according to statement separation marks stored in the file. In this second scenario, only the pages containing color printing of the statements addressed to the deadbeats are printed on the color printer.

In both scenarios, the invention eliminates the need to create two or more separate data files, one containing all deadbeat files and the other containing standard files. The invention requires only one data file for printing.

Another example of the invention's operation is the preparation of a complete book from a single file of input text and descriptive information. A typical such paperback book has a front cover and a back cover, a printed spine, a number of text pages on a first grade of paper, a number of color illustration pages on a second grade of paper, a number of section division pages or tabbed pages on a third grade of paper, one or more foldout pages containing maps or diagrams on a fourth grade of paper, and possibly one or more pages with mounted packages containing electronic media such as floppy disks or CD-ROMs. Using the invention, all the information necessary to produce the required sequence of pages of all types described above is created and maintained in the input file originally provided to the invention for printing. To produce the desired book on the available equipment, the operator of the invention displays each page of the book and uses the invention's menus to assign an appropriate output printing device for each page ('tag' the page) or series of pages. The assignment of output printing devices may include information enabling the recombination of divided streams of output in the desired final output sequence for the complete document.

Figure 3:
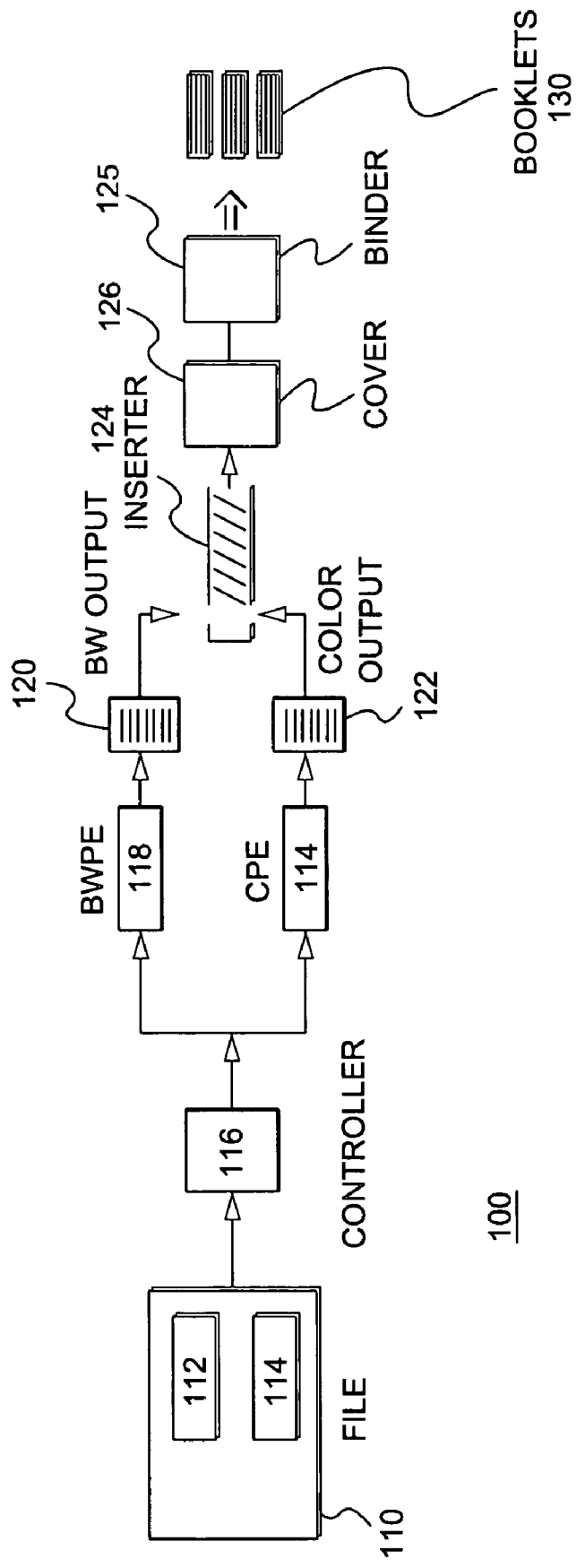
FIG. 3 is a schematic representation of a machine for carrying out the method of the invention.

Turing to FIG. 3, there is shown a machine 100 capable of carrying out the method of the invention. The printing machine 100 receives electronic documents 110 that include black and white only pages 112 and color pages 114. A controller 116 has a central processing unit and a computer program that reads the file 100 and separates the identified black and white pages from the color pages. The controller 116 is coupled to a black and white page print engine 118 and a color print engine 119. Those skilled in the art understand that other print engines may be coupled to the controller 116. Only two print engines are shown for illustrating the invention. The black and white pages are printed on engine 118 and the color pages are printed on engine 119. The black and white print engine 118 may print several different jobs in sequential order while the color print engine is working on only one job. The outputs of the respective engines are delivered to storage bins 120, 122, respectively. Each bin may hold one or more jobs outputs. When the black and white and color pages for a job are completed, the respective outputs are manually or automatically fed into an inserter 124. It collates the black and white pages with the color pages to form integrated booklets. The booklets may be fed to one or more finishing modules 126, 128 where they receive covers and are bound together to form completed booklets 130.

Those skilled in the art will understand that the black and white print engine 118 may print a number of all black and white jobs and jobs that include color pages. The jobs are output to the storage bins 120. If the job is all black and white, then it can be along to the finishing modules. If the job is color, it is held in the storage bin 120 until the color portion of the job is completed. Then the color output is taken from color storage bin 122 and fed to the inserter 124. The invention improves the overall printing speed for multiple jobs. The simpler and faster black and white prints are made independent of the printing of the color pages. Unlike prior art systems that sequentially print each page in color or black and white, the invention speeds up the printing of multiple jobs by printing black and white pages out of sequence with the color pages so that the faster black and white printing operations are not delayed by the slower color printing operations.

What is claimed is:

1. A method for printing monochrome pages with one color and colored pages with multiple colors comprising:
generating an electronic document file having data signals representative of sequential pages in the document;
providing data signals for each page representative of whether the page is a monochrome page or a colored page;
providing a plurality of printers including a monochrome printer and a color printer;
selecting at least one monochrome printer and one color printer;
without creating a new document, sending the monochrome pages to a selected monochrome printer and sending the color pages to a selected color printer,
wherein the step of sending the monochrome pages to a selected monochrome printer and sending the color pages to a selected color printer further comprises:
using a single key depression or mouse selection by a user, displaying a selection menu containing entries for a class of monochrome printers and a class of color printers;
accepting a selection of one of the classes of printers from the user;
marking one or more pages to be printed using the selected class of printers;
using a single selection action by an operator, displaying a selection menu containing entries for printers in the selected class of printers;
using a single selection action by an operator, accepting a selection of one of the printers from the operator; and
marking one or more pages to be printed on the selected printer.

2. The method of claim 1 wherein the single selection action by an operator for displaying a selection menu comprises one or more mouse selections.

3. The method of claim 1 wherein the single selection action by an operator for selecting one of the printers comprises one or more mouse selections.

4. A method for printing a document with pages having different printing attributes comprising:
generating an electronic document file having data signals representative of sequential pages wherein each page has at least one of a selected number of printing attributes;
providing data signals for each page representative of the printing attributes of the page;
providing a plurality of printers including at least one printer capable of printing pages with the selected printing attributes;
without creating a new document, sending the attributed pages of the document to a printer capable of printing the printing attributes of the page, wherein the step of sending the attributed pages of the document to a printer capable of printing the printing attributes of the page further includes the steps of:
using a single key depression or mouse selection by a user, displaying a selection menu containing entries for classes of printers possessing desired attributes;
accepting a selection of one of the classes of printers from an operator;
marking one or more pages to be printed using the class of selected printers;
using a single selection action by an operator, displaying a selection menu containing entries for printers in the class selected by the user;
using a single selection action by an operator, accepting a selection of one of the printers from an operator; and
marking one or more pages to be printed on the selected printer.

5. The method of claim 4 wherein the pages having different attributes are printed asynchronously.

6. The method of claim 4 comprising the further step of collating the pages having different attributes with each other into the same sequence of pages as found in the electronic document.

7. The method of claim 4 wherein the step of providing a plurality of printers further comprises:
storing a list of all available printers;
selecting a subset of printers with required attributes from the list;
displaying on a menu the selected subset of printers with required attributes.

8. The method of claim 4 wherein the step of sending the attributed pages of the document to a printer capable of printing the printing attributes of the page further comprises:
using a single selection action by an operator, displaying a selection menu containing entries for printers possessing desired attributes;
using a single selection action by an operator, accepting a selection of one of the printers from an operator;
marking one or more pages to be printed on the selected printer.

9. The method of claim 8 wherein the single selection action by an operator for displaying a selection menu comprises one or more mouse selections.

10. The method of claim 8 wherein the single selection action by an operator for selecting one of the printers comprises one or more mouse selections.

11. The method of claim 4 wherein the single selection action by an operator for displaying a selection menu comprises one or more mouse selections.

12. The method of claim 4 wherein the single selection action by an operator for selecting one of the printers comprises one or more mouse selections.

13. The method of claim 4 wherein the printing attributes comprise at least one monochrome page and at least one colored page.

14. A method for publishing a document with pages having different presentation attributes comprising:
generating an electronic document file having data signals representative of sequential pages wherein each page has at least one of a selected number of presentation attributes;
providing data signals for each page representative of the presentation attributes of the page;
providing a plurality of output devices including at least one output device capable of producing pages with the selected presentation attributes;
without creating a new document, sending the attributed pages of the document to an output device capable of producing the presentation attributes of the page wherein the step of sending the attributed pages of the document to an output device capable of producing the presentation attributes of the page further includes the steps of:
using a single key depression or mouse selection entered by an operator, displaying a selection menu containing entries for output devices possessing desired attributes, and an entry indicating that no presentation is to be made and no output device selected;
accepting a selection of one of the menu entries from an operator;
marking one or more pages to be published on the selected output devices;
marking distinctly all pages for which no presentation is to be made and no output device is selected;
suppressing the sending to an output device for all pages for which no presentation is to be made and no output device is selected.

15. The method of claim 14 wherein the pages having different attributes are published asynchronously.

16. The method of claim 14 comprising the further step of collating the pages having different attributes with each other into the same sequence of pages as found in the electronic document.

17. The method of claim 14 wherein the step of providing a plurality of output devices further comprises:
storing a list of all available output devices;
selecting a subset of output devices with required attributes from the list;
displaying on a menu the selected subset of output devices with required attributes.

18. A method for publishing a document with pages having different presentation attributes comprising:
generating an electronic document file having data signals representative of sequential pages wherein each page has at least one of a selected number of presentation attributes;
providing data signals for each page representative of the presentation attributes of the page;
providing a plurality of output devices including at least one output device capable of producing pages with the selected presentation attributes;
without creating a new document, sending the attributed pages of the document to an output device capable of producing the presentation attributes of the page wherein the step of sending the attributed pages of the document to an output device capable of producing the presentation attributes of the page further includes the steps of:

using a single key depression or mouse selection entered by a user, displaying a selection menu containing entries for a class of output devices possessing desired attributes, and an entry indicating that no presentation is to be made and no output device selected;

accepting a selection of one of the menu entries from a user;

marking one or more pages to be published on the selected class of output devices;

marking distinctly all pages for which no presentation is to be made and no output device is selected;

using a single key depression or mouse selection entered by an operator, displaying a selection menu containing entries for output devices in the class selected by the user, and an entry indicating that no presentation is to be made and no output device selected;

accepting a selection of one of the menu entries from an operator;

marking one or more pages to be published on each of the selected output devices;

marking distinctly all pages for which no presentation is to be made and no output device is selected;

suppressing the sending to an output device for all pages for which no presentation is to be made and no output device is selected.

19. A method for printing monochrome pages with one color and colored pages with multiple colors comprising:

generating an electronic document file having data signals representative of sequential pages in the document;

providing data signals for each page representative of whether the page is a monochrome page or a colored page;

providing a plurality of printers including a monochrome printer and a color printer;

selecting at least one monochrome printer and one color printer;

without creating a new document, sending the monochrome pages to a selected monochrome printer and sending the color pages to a selected color printer wherein the step of sending the monochrome pages to a selected monochrome printer and sending the color pages to a selected color printer further comprises:

using a single key depression or mouse selection by a user, displaying a selection menu containing entries for a class of monochrome printer and a class of color printers;

accepting a selection of one of the classes of printers from the user;

marking one or more pages to be printed using the selected class of printers;

using a single selection action by an operator, displaying a selection menu containing entries for printers in the selected class of printer;

using a single selection action by an operator, accepting a selection of one of the printers from the operator; and marking one or more pages to be printed on the selected printer.

20. The method of claim 19 wherein the single selection action by an operator for displaying a selection menu comprises one or more mouse selections.

21. The method of claim 19 wherein the single selection action by an operator for selecting one of the printers comprises one or more mouse selections.

* * * * *